Figure 1:
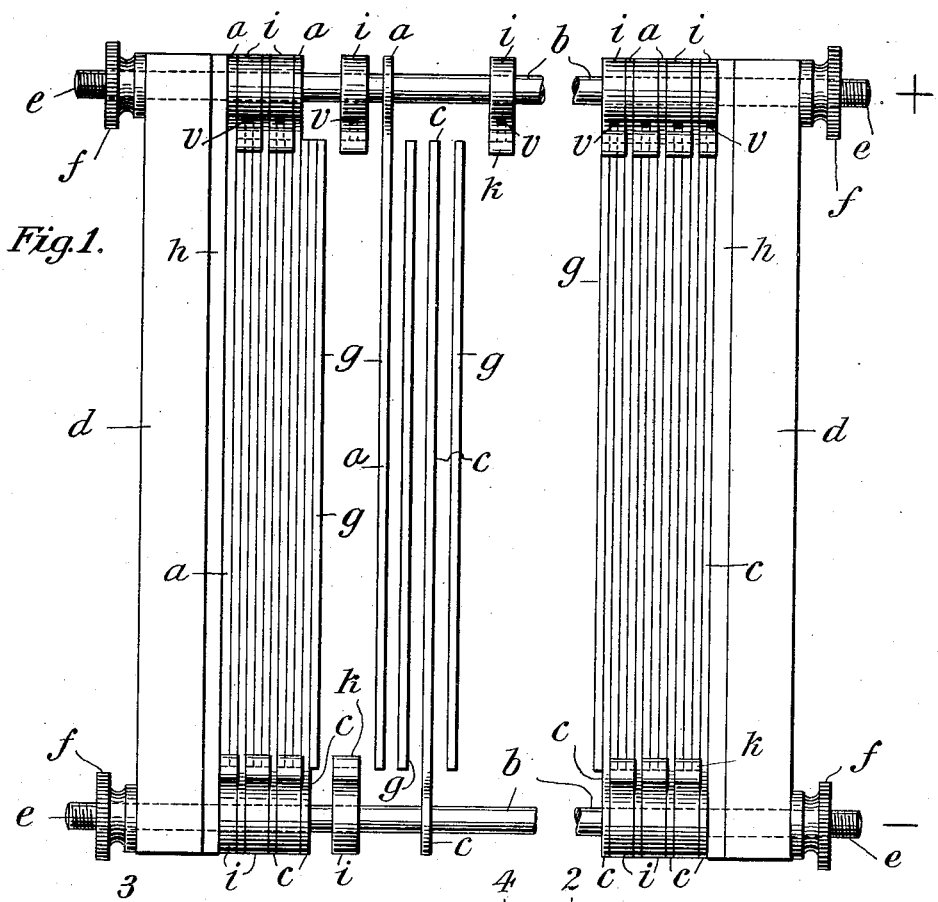

No. 880,420. PATENTED FEB. 25, 1908.
A. O. TATE.
STORAGE BATTERY PLATE.
APPLICATION FILED DEC. 1, 1905.

WITNESSES:
C. E. Ashley
M. F. Keating

INVENTOR
Alfred O. Tate
By his Attorney,
Charles J. Kintner

UNITED STATES PATENT OFFICE.

ALFRED O. TATE, OF TORONTO, ONTARIO, CANADA, ASSIGNOR TO TATE ELECTROLYTIC COMPANY OF AMERICA, A CORPORATION OF NEW YORK.

STORAGE-BATTERY PLATE.

No. 880,420.      Specification of Letters Patent.      Patented Feb. 25, 1908.

Application filed December 1, 1905. Serial No. 289,796.

*To all whom it may concern:*

Be it known that I, ALFRED O. TATE, a subject of the King of Great Britain, residing in the city of Toronto, county of York, Province of Ontario, Dominion of Canada, have made a new and useful Invention in Storage - Battery Plates, of which the following is a specification.

My invention is directed especially to an improvement in storage batteries in which the active material, such as lead-oxid, is applied directly to conducting plates, grids, or the like, and known in the art generally as of the Faure type, and its distinguishing characteristic lies in the fact that it embraces in a single plate both positive and negative functions; that is to say, each plate embraces a series of anodes and a series of cathodes, each of relatively narrow cross section and all closely interconnected and interrelated in such manner as to constitute a compact electrode plate, and it has for its objects, first, to effect the reduction of the internal resistance of a cell to practically the lowest possible amount. Second, to increase the effective working surface of a cell to practically the highest possible extent: Third, to increase the efficiency of a cell to practically the highest point for given weights of material used. Fourth, to construct a storage battery of the Faure type of such a nature that "buckling" is absolutely impossible. Fifth, to construct a storage battery plate of the Faure type in which there shall be no possibility of deterioration through detrition of the active material. Sixth, to construct a storage battery plate of the Faure type which shall not be injured by over-charging or over-discharging. Seventh, to construct a storage battery plate of the Faure type which shall have great mechanical strength. Eighth, to construct a storage battery plate of the Faure type of a series of strips or ribbon-like anodes and cathodes so interleaved or interrelated and bound together that the charging or discharging current is caused to pass through the smallest possible volumes of the electrolyte and that the active material shall always be retained between the anodes and cathodes. Ninth, to construct a storage battery plate of the Faure type in which the active surfaces are in the nature of thin film like structures whereby the charging and discharging rates may be largely increased and without the usual damaging effects. Tenth, to construct a storage battery plate of the Faure type of great flexibility. Eleventh, to construct a storage battery plate of the Faure type embodying both positive and negative functions, which is hereinafter referred to as a bi-functional plate in contradistinction to all plates which have been utilized in the art heretofore and which are universally unifunctional; that is to say, possess either positive or negative functions only.

Heretofore all storage batteries of the Faure type known by me to be in commercial use have been so constructed as to embody not less than two complete individual plates representing respectively the positive and negative elements of the assembled cell. In all such cells the total internal resistance is represented by the resistance of the plates exposed in the electrolyte, plus the resistance of the electrolyte itself. Each plate is connected, when being charged, with one of the poles of the charging generator. The charging current enters the first plate or series of such plates at a definite point or points at one edge, and enters the electrolyte through the entire face or faces thereof, passing thence through the whole volume of the intervening electrolyte to the entire face or faces of the negative plate or plates, and out of the latter at one edge by a connection or connections in all respects like those before described.

In all such storage-battery cells the positive and negative plates forming the element are electrically interdependent; that is to say, the current flows from one series of plates to the companion series; thus when the cell is in action all of the plates of which it is composed are in electrical contact, each with the other through the medium of the electrolyte, and this interdependent relation is and necessarily must be invariably maintained.

My invention does not relate to the construction of a storage battery element composed of a series of plates, but has reference solely to the construction of a single plate of the Faure type which differs from any such plate heretofore invented, in that it possesses both positive and negative functions; whereas all other storage battery plates of said type possess one function only, this being either positive or negative. In other words, mine is a bi-functional plate, while all other plates of the Faure type are unifunctional. When a number of my plates are assembled in a cell in multiple relation they are not necessarily in electrical contact through the medium of the electrolyte, because each plate is an absolutely independent unit and performs all its functions without any reference whatever to other plates in the series. The current flows across and through my plate in a lateral direction, entering it at one side and leaving it at the other, and any electrical contact that there may be between a series of these plates through the medium of the electrolyte is purely incidental. They are not inter dependent but are in all respects absolutely independent each of the other.

An attempt has heretofore been made in the art, as disclosed in British Patent No. 1610 of 1886, to form a storage battery plate of the Planté type of a bi-functional nature, by interleaving thin narrow lead strips so as to constitute anodes and cathodes and connecting the alternate sets of such strips, one to a positive pole and the other to a negative pole, said strips being separated from each other by relatively thin porous insulating media and all bound together inside a wooden frame and held therein by a wooden block at the top thereof. It is obvious to anyone skilled in the art that such a battery as this would be commercially impractical, for the reason that these thin strips in this form of cell would be very rapidly reduced to lead oxid under normal operation of the Planté type of cell, and the structure would rapidly fall to pieces. That this condition was anticipated by the inventor himself is shown by the means which he provided—and which he refers to in his specification—for arresting the disintegrated portions of the plates, in order to prevent short circuiting. I am also aware that a storage battery plate of the Faure type and of a bifunctional nature has heretofore been devised in which the positive and negative elements are located in a horizontal plane, as disclosed in Figs. 5 to 8 inclusive of the drawings of U. S. patent to A. S. Krotz, No. 583,912, granted June 8th, 1897, and I make no claim hereinafter broad enough to include such a structure.

In my novel plate the strips which I use are protected from disintegration by an alloy of antimony and are furthermore protected from this action by the applied oxid films. These films are so held in place that it is impossible for the oxid or active material at any time to escape and the result of this construction is that the life of my plate is indefinite and necessarily must be very long; thus fulfilling one of the most valuable and desirable requirements that exists in connection with the use of storage battery cells.

Figure 2:
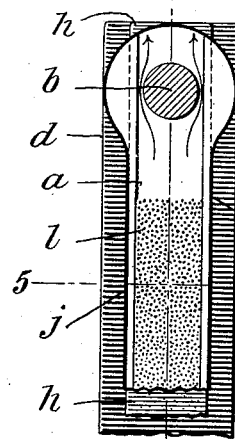
Figure 3:
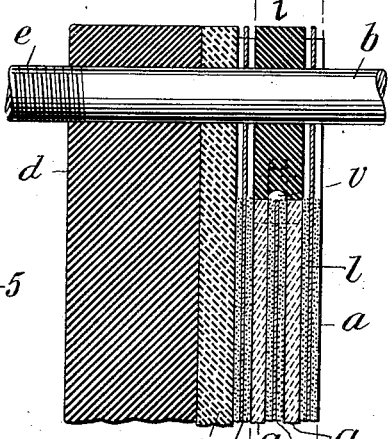
Figure 4:
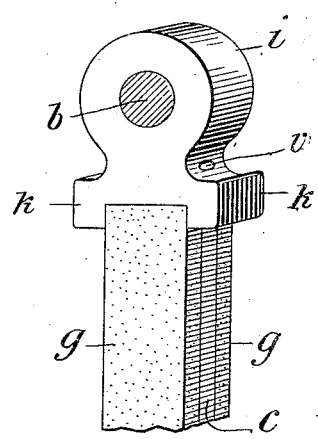
Figure 5:
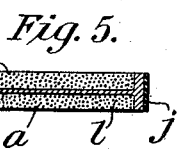

For a full and clear understanding of my invention, such as will enable others skilled in the art to construct and use the same, reference is had to the accompanying drawings, in which, Figure 1 represents a side elevational view of one of my novel bi-functional storage battery plates showing the parts separated in the central part thereof, so as to better understand the manner of effectually binding all of the same together. Fig. 2 is an enlarged detail and vertical sectional view showing the interior structure, said section being taken on the line 2—2, Fig. 3, and as seen looking thereat from right to left in the direction of the arrows. Fig. 3 is a sectional view taken through Fig. 2 on the line 3—3, showing the relation of the essential parts of a complete plate. Fig. 4 is a perspective view showing one of the spacing, locking or holding blocks and the manner in which they are strung upon one of the conducting rods which constitute the poles of the plates; and Fig. 5 is a sectional view on a largely exaggerated scale of one of the anode and cathode strips or ribbons illustrating the active material in position and the manner of insulating its lateral or exposed edges from the electrolyte, said view being taken on the line 5—5 Fig. 2.

Referring now to the drawings in detail, in all of which like letters of reference represent like parts, $a$ and $c$ represent respectively the anodes and cathodes of a complete bi-functional plate, made preferably of relatively narrow strips or ribbons of antimonious lead of about one one-hundredth of an inch in thickness and having at their lateral edges and lower ends on both faces retaining flanges of about one thirty-second of an inch in depth. It is the function of these flanges to act as pockets for holding the oxid or other active material $l$, (see Fig. 5) and in such manner that, when the parts are assembled, it cannot escape. These pockets, in both instances, are all open at their tops so as to afford a free egress for the gases liberated, as clearly shown in the drawings. Each of the anodes and cathodes is provided at one end with a circular opening which adapts it to be strung upon a conducting bar or rod $b$, the upper bar sustaining the anodes $a$ and the lower one the cathodes $c$, or vice versa.

$d$, $d$, are hard rubber or equivalent binding blocks for holding the entire plate together by end pressure. $i$, $i$, are insulating spacing and locking blocks; said blocks $d$, $d$, and $i$, $i$, having cylindrical holes adapting them to be strung upon the conducting rods or bars $b$, $b$, with the anode and cathode strips or ribbons. Each spacing block $i$ is provided with locking shoulders $k$, $k$, for firmly holding the individual parts of the plate against lateral movement when assembled, and with vent holes $v$, $v$, for releasing the gases, $g$, $g$, being thin porous insulating diaphragms, preferably of kaolin, for separating the anodes and cathodes and affording free passage of the electrolyte through their edges into contact with them.

e, e and e, e are screw-threads on the ends of the bars or rods b, b and f, f, ff, are binding nuts which serve the function of binding all of the parts firmly together, constituting also the usual binding posts for connecting up the plate to be charged or discharged.

h, h, are sheets of soft rubber or equivalent yielding material which act as cushions and compensate for any expansion or contraction of the completed plate when in use.

After the parts are all assembled and firmly secured together in the manner described and as will be apparent on examination of Fig. 1 of the drawings, the lateral edges of the anodes and cathodes are scored or indented and then coated with an insulating paint j, such as gutta percha or any well known equivalent, so that the electrolyte will not attack the same and can only reach the anodes and cathodes through the edges of the porous diaphragms g, g.

Storage battery plates of this nature are assembled in cell form in any preferred manner as, for instance, in the well known way by sustaining grooves in a battery trough or box of treated wood; or, of hard rubber, glass or the like. They may then be connected up in multiple, or in series, as desired, and in accordance with the service for which they are designed to be used. Plates of this type may be assembled in large units in the same manner as disclosed by me in a prior patent No. 857,910, granted to me by the U. S. Patent Office on the 25th day of June, 1907.

I do not limit my invention to the specific details of construction shown in the accompanying drawings, as I believe it is broadly new with me to provide a storage battery plate of the Faure type and of a bifunctional nature, in which the anodes and cathodes are composed of strips of conducting material interleaved; said anodes and cathodes being coated on their opposite faces with active material and separated from each other by narrow strips of porous insulating media, the arrangement being such that the porous insulating media holds the active material in place, the inflow of the electrolyte being always through the edges of the porous insulating media.

Having thus described my invention what I claim and desire to secure by Letters Patent of the United States is—

1. A bi-functional storage battery plate of the Faure type embodying a plurality of narrow conducting anode strips electrically connected together at one end and a plurality of similar intervening cathode strips connected together at the other end; in combination with a layer of porous insulating material between each anode and cathode strip; the insulating medium being so arranged that it affords an effective protection to the active material, substantially as described.

2. A bi-functional storage battery plate embracing anodes and cathodes of narrow conducting strips or ribbons closely related mechanically and electrically; in combination with a porous insulating medium between each anode and cathode, the anodes being all connected together by a conductor at one end and the cathodes similarly connected at the other end, said anodes and cathodes being insulated on their lateral edges, whereby current charge and discharge can only be effected through the faces thereof and the intervening porous media, substantially as described.

3. A bi-functional storage battery plate embracing a series of narrow strip like anodes and a series of intervening cathodes of similar structure; in combination with layers of porous insulating media between said anodes and cathodes and conducting binding means at each end of the plate constituting respectively the plus and minus poles thereof, substantially as described.

4. A bi-functional storage battery plate embracing a series of thin narrow ribbon like anodes and a series of similarly constructed cathodes connected electrically, one set to a conducting rod or bar and the other set to a similar rod or bar; said anodes and cathodes being each coated on opposite sides with active material in combination with porous insulating material between said anodes and cathodes, and means for binding all of the parts together, substantially as described.

5. A bi-functional storage battery plate embracing a series of thin narrow ribbon like anodes having lateral flanges; a series of cathodes similarly constructed, and porous insulating media between said anodes and cathodes; in combination with binding means and yielding cushions for compensating for expansion and contraction of the parts; together with active material located in the grooves between said strips, substantially as described.

6. A bi-functional storage battery plate embracing interleaved anodes and cathodes, consisting of thin narrow strips having lateral flanges, said anodes and cathodes being separated by porous insulating media and connected in multiple at their ends to conducting bars or rods; in combination with binding blocks, yielding cushions and spacing blocks, all so arranged as to constitute one compact unit, substantially as described.

7. A bi-functional storage battery plate embracing anodes and cathodes, consisting of thin narrow conducting strips provided with lateral flanges having active material applied to their faces between the flanges, and connected respectively in multiple at the opposite ends to conducting bars or rods; in combination with intervening porous insulating diaphragms, the inter-relation of the parts being such that a minimum resistance is effected to the current flow and a maximum surface is exposed to the electrolyte, substantially as described.

8. A storage battery plate embracing the following elements in combination:—interspaced strips of conducting material constituting respectively anodes and cathodes; intervening porous insulating media; end plates or blocks; yielding cushions between the end plates or blocks and the adjacent end anodes or cathodes; interspacing and locking blocks; binding bolts and nuts therefor, all so arranged that when bound together they constitute one complete bi-functional plate, substantially as described.

9. A bi-functional storage battery plate having its anodes and cathodes in close mechanical relation with each other and separated by narrow strips of porous insulating media, the assembled parts being so arranged that the current flow in charging or discharging is through the anodes to and through the insulating media and the electrolytic layer or vice versa, the fluid supply being effected by passage thereof through the lateral edges only of the insulating media, substantially as described.

In testimony whereof I have signed my name to this specification in the presence of two subscribing witnesses.

ALFRED O. TATE.

Witnesses:
C. J. KINTNER,
M. F. KEATING.